(12) United States Patent
Ghavanini et al.

(10) Patent No.: US 11,482,033 B2
(45) Date of Patent: Oct. 25, 2022

(54) CONTROLLABLE ULTRASONIC FINGERPRINT SENSING SYSTEM AND METHOD FOR CONTROLLING THE SYSTEM

(71) Applicant: FINGERPRINT CARDS AB, Gothenburg (SE)

(72) Inventors: Farzan Ghavanini, Gothenburg (SE); Jonas Tallhage, Gothenburg (SE); Frank Riedijk, Delft (NL); René Nilsson, Eslöv (SE); Wieslaw Bicz, Wrocław (PL); Agnieszka Bicz, Wrocław (PL)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 4 days.

(21) Appl. No.: 16/757,808

(22) PCT Filed: Oct. 23, 2018

(86) PCT No.: PCT/SE2018/051084
§ 371 (c)(1),
(2) Date: Apr. 21, 2020

(87) PCT Pub. No.: WO2019/088896
PCT Pub. Date: May 9, 2019

(65) Prior Publication Data
US 2021/0357603 A1    Nov. 18, 2021

(30) Foreign Application Priority Data
Oct. 31, 2017 (SE) ..................... 1751354-0

(51) Int. Cl.
*G06V 40/13* (2022.01)
*G06F 3/041* (2006.01)
*G06F 3/043* (2006.01)

(52) U.S. Cl.
CPC ........ *G06V 40/1306* (2022.01); *G06F 3/0436* (2013.01); *G06F 3/041661* (2019.05)

(58) Field of Classification Search
CPC ................ G06K 9/0002; G06F 3/0436; G06F 3/041661; G06F 1/3262; G06F 1/32;
(Continued)

(56) References Cited

U.S. PATENT DOCUMENTS

2014/0270413 A1    9/2014   Slaby et al.
2014/0354556 A1    12/2014  Mameh et al.
(Continued)

FOREIGN PATENT DOCUMENTS

CN    106991387 A    7/2017
EP    3032385 A1     6/2016
(Continued)

OTHER PUBLICATIONS

Karagoz et al. Improving image quality of diagnostic ultrasound by using the safe use time model with the dynamic safety factor and the effect of the exposure time on the image quality. Ultrasonics. Epub Jul. 5, 2011. PMID: 21783221. https://pubmed.ncbi.nlm.nih.gov/21783221/ (Year: 2011).*
(Continued)

*Primary Examiner* — Jonathan A Boyd
(74) *Attorney, Agent, or Firm* — RMCK Law Group, PLC (57) ABSTRACT

A method for controlling a plurality of ultrasonic transducers in a fingerprint sensing system that comprises a cover plate having a sensing surface configured to be touched by a finger, and a plurality of ultrasonic transducers located at the periphery of the cover plate and configured to transmit an acoustic signal propagating in the cover plate, receive an ultrasonic signal having interacted with an object in contact with the sensing surface, and to determine properties of the object based on the received ultrasonic signal. The method comprises: in response to a first input, controlling the plurality of transducers such that at least a portion of the sensing surface has a first feature detection resolution; and in response to a second input, controlling the plurality of
(Continued)

transducers such that at least a portion of the sensing surface has a second feature detection resolution, different from the first feature detection resolution.

20 Claims, 5 Drawing Sheets

(58) Field of Classification Search
CPC ........ G06F 1/3231; G06F 3/041; G06F 3/043; G06V 40/1306; G06V 10/17; G06V 10/24; G06V 40/1347; G06V 10/25
See application file for complete search history.

(56) References Cited

U.S. PATENT DOCUMENTS

| | | |
|---|---|---|
| 2015/0123931 A1 | 5/2015 | Kitchens et al. |
| 2015/0169136 A1* | 6/2015 | Ganti ................ H01L 41/0973 345/177 |
| 2015/0189136 A1* | 7/2015 | Chung ............... G06V 40/1306 348/77 |
| 2016/0246396 A1* | 8/2016 | Dickinson ........... G06F 3/03545 |
| 2017/0053151 A1 | 2/2017 | Yazandoost et al. |

FOREIGN PATENT DOCUMENTS

| | | | |
|---|---|---|---|
| EP | 3173974 A1 | 5/2017 | |
| WO | 2014081721 A1 | 5/2014 | |
| WO | WO-2014081721 A1 * | 5/2014 | ........... G06F 3/0436 |

OTHER PUBLICATIONS

Extended European Search Report dated Nov. 10, 2020 for European Patent Application No. 18873956.9, 8 pages.
PCT International Search Report and Written Opinion dated Jan. 31, 2019 for International Application No. PCT/SE2018/051084, 12 pages.

* cited by examiner

CONTROLLABLE ULTRASONIC FINGERPRINT SENSING SYSTEM AND METHOD FOR CONTROLLING THE SYSTEM

CROSS-REFERENCE TO RELATED APPLICATIONS

This application is a 371 U.S. National Stage of International Application No. PCT/SE2018/051084, filed Oct. 23, 2018, which claims priority to Swedish Patent Application No. 1751354-0, filed Oct. 31, 2017. The disclosures of each of the above applications are incorporated herein by reference in their entirety.

FIELD OF THE INVENTION

The present invention relates to a biometric imaging system comprising ultrasonic transducers and to a method of controlling such a biometric imaging system.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released personal communication devices, such as mobile phones.

Due to their excellent performance and relatively low cost, capacitive fingerprint sensors are used in an overwhelming majority of all biometric systems.

Among other fingerprint sensing technologies, ultrasonic sensing also has the potential to provide advantageous performance, such as the ability to acquire fingerprint (or palmprint) images from very moist fingers as well as to provide biometrics data beyond the surface of the skin. One class of ultrasonic fingerprint systems of particular interest are systems in which acoustic signals are transmitted from the periphery of a device member to be touched by a user, and a fingerprint (palm print) representation is determined based on received acoustic signals resulting from the interaction between the transmitted acoustic signals and the user's skin.

Such ultrasonic fingerprint sensing systems, which are, for example, generally described in US 2017/0053151 may allow for a larger sensing area, which may be optically transparent, without the cost of the fingerprint sensing system necessarily scaling with the sensing area.

Although the general principle of such ultrasonic fingerprint sensing is known, there appear to be remaining challenges to be overcome. For instance, it would be desirable to provide for cost-efficient mass production of ultrasonic transducer devices suitable for use in such ultrasonic fingerprint sensing systems.

SUMMARY

In view of above-mentioned and other drawbacks of the prior art, it is an object of the present invention to provide an improved ultrasonic fingerprint sensing and a method for controlling such a system.

According to a first aspect of the invention, there is provided a method for controlling a plurality of ultrasonic transducers in a fingerprint sensing system. The fingerprint sensing system comprises a cover plate having a sensing surface configured to be touched by a finger, and a plurality of ultrasonic transducers located at the periphery of the cover plate, wherein the plurality of ultrasonic transducers are configured to transmit an acoustic signal propagating in the cover plate, receive an ultrasonic signal having interacted with an object in contact with the sensing surface, and to determine properties of the object based on the received ultrasonic signal. The method comprises: in response to a first input, controlling the plurality of transducers such that at least a portion of the sensing surface has a first feature detection resolution; and in response to a second input, controlling the plurality of transducers such that at least a portion of the sensing surface has a second feature detection resolution, different from the first feature detection resolution.

The described fingerprint sensing system may be arranged in an electronic device such as a smartphone, tablet computer or the like, where the sensing surface also forms an exterior surface of the electronic device to be touched by a finger. The sensing surface may thus be the exterior surface of a touch sensitive display. The sensing system may also be used to acquire and identify palm prints of a user. The concept of fingerprint sensing may also be described as fingerprint imaging, biometric imaging and biometric sensing etc.

That the fingerprint sensing system has a controllable feature detection resolution should in the present context be interpreted to mean that at least one of the ultrasonic transducers is active and transmitting a signal which is capable of interacting with an object touching the sensing surface, and that an interaction signal is detectable by a transducer after interaction with the object. From the interaction signal, it is assumed that some features of the object touching the sensing surface can be determined.

The sensing surface is the entire surface of the fingerprint sensing system where it is theoretically possible to detect an object touching the surface. As an example, the sensing surface may be a display area in an application where the fingerprint sensing system is integrated in a display. However, it is equally possible that the theoretical sensing surface is smaller than such a display.

The present invention is based on the realization that it is desirable to be able to control the plurality of ultrasonic transducers according to various application requirements such that the resolution of the fingerprint sensing system can be controlled. The resolution of the fingerprint sensing can in general be assumed to be proportional to the degree of certainty with which a fingerprint can be identified. Accordingly, a low resolution offers a lower degree of certainty than what a higher resolution provides. However, since not all applications have the same requirements of a fingerprint sensing system, the described method can thereby provide a flexible solution were the resolution is controllable.

Moreover, by controlling the resolution in a controllable area, specific applications are not limited by a fixed fingerprint sensing area configuration but may instead control the fingerprint sensing system to provide fingerprint sensing according to the application requirements.

According to one embodiment of the invention, controlling the plurality of ultrasonic transducers may comprise controlling each of the transducers to be in an on-state or in an off-state. Thereby, it is not required that all of the transducers are active at a given time. This in turn leads to a possibility of saving power since only the transducers required in a selected configuration need be active, i.e. in an on-state, thereby making it possible to minimize the power consumption. A further advantage of using a lower number of transducers when performing imaging is that the number of received signals is correspondingly lower, which in turn reduces the power consumption in the readout and signal processing circuitry. In applications where the emitting transducers are activated sequentially during an image capture, i.e. where only one transducer at the time is active (multiple receivers may be active simultaneously also during sequential activation of emitters), the time it takes to capture an image is reduced. Accordingly, there are several advantages related to reducing the number of active transducers in an image capture sequence.

According to one embodiment of the invention, the method may further comprise controlling a power level of each ultrasonic transducer in a continuous range between an off-state and a maximum power state. Thereby, additional flexibility and control is provided since each transducer can be carefully controlled to provide the required fingerprint sensing properties for a given application and the resolution of the fingerprint sensing can be controlled by controlling the power of the individual transducers.

In simplified terms, the resolution of the fingerprint sensing system scales with the power provided to the transducers where a higher power leads to a larger amplitude of the generated acoustic signal, i.e. a stronger signal, which in turn leads to a stronger acoustic response in the interaction signal. Thereby, the minute details of the fingerprint which would have been otherwise buried under noise floor can be detected successfully.

It should also be noted that it is important to control the power to each individual transducer so that the desired resolution is achieved at the selected area portion of the sensing surface. The power to each individual transducer is typically provided as pulsed power, and the time averaged power to a transducer can be controlled by controlling the pulse amplitude, pulse width (i.e. duty cycle) and pulse repetition frequency.

According to one embodiment of the invention, the first feature detection resolution and the second feature detection resolution may advantageously be selected from a group of predetermined feature detection resolutions comprising: a touch detection resolution mode, a low resolution fingerprint detection mode, a high resolution fingerprint detection mode, and an enrolment mode. By describing distinct modes of feature detecting resolution based on the detectable feature, implementation of different controlled resolutions may be facilitated. In a touch detection resolution mode, it is sufficient that it is possible to determine when an object touches the sensing surface. The feature detection resolution mode may thereby be seen as a sleep mode which can detect a touch. The, feature detection resolution mode can thereby be implemented in a "tap-to-wake" application where the power consumption of the fingerprint sensing device is minimized while still being able to wake up when touched.

A low resolution fingerprint mode can be used when it is desirable to verify the fingerprint but when lower accuracy is acceptable and/or when lower power consumption is required. Correspondingly, the high resolution fingerprint detection mode is advantageously used when a high accuracy is required and where the power consumption is less important. An application example utilizing both the high and low resolution modes could be an electronic device where a user initially is verified using the high resolution mode, and where subsequent verifications are performed intermittently using the low resolution mode to verify that it is still the same user which uses the device.

The mode providing the highest possible feature detection resolution may be referred to as an enrolment mode where it is desirable to capture a fingerprint with the highest resolution possible to form a fingerprint template comprising as much detail as possible. A low resolution mode can also be used as a so called "touch detection resolution mode" which in this regard can be compared with capacitive touch detection. For higher resolution modes, the sensing system operates at resolutions enabling fingerprint detection at industry standards. A fingerprint detection resolution mode may vary between 100 dpi up to 1000 dpi based on the security level required. Depending on the configuration of the ultrasonic transducers and associated readout circuitry even higher resolutions may be achievable.

According to one embodiment of the invention the first input and/or the second input may be a command to form an area of the sensing surface having a resolution selected from the group of predetermined feature detection resolutions. Accordingly, a specific area of the sensing surface, which may be the full sensing surface area or part of the sensing surface area, can be formed based on a command issued by an application so that a control unit controls the plurality of ultrasonic transducers to form the requested area having the requested properties. It can be assumed that the capabilities of the fingerprint sensing system in terms of possible resolutions and area control are known to an application operating in an electronic device comprising the fingerprint sensing system.

According to one embodiment of the invention, the first input and/or the second input may be generated by the detection of an object touching the sensing surface. Thereby, the electronic device comprising the fingerprint sensing system may be configured to automatically switch from a first resolution mode to a second resolution mode in response to an object touching the sensing surface. This embodiment may be exemplified by the above described tap-to-wake functionality, where the wake-up action is followed by a fingerprint imaging and verification step.

According to one embodiment of the invention, the method may further comprise; receiving a first input comprising a command to control the plurality of ultrasonic transducers to form a touch detection mode area corresponding to at least a portion of the sensing surface; detecting an object in contact with the sensing surface in the touch detection area; estimating a contact area of the object; and where the second input comprises increasing the resolution of the contact area to a resolution required for fingerprint detection. Accordingly, it is possible to automatically capture a fingerprint image from any part of the sensing surface in response to a touch on the sensing surface. Thereby, a user authentication can be performed automatically in response to a user placing a finger on any part of the sensing surface.

According to one embodiment of the invention the method may further comprise controlling the plurality of ultrasonic transducers such that active transducers form a non-uniform distribution around the circumference of the cover plate. Accordingly, it is possible to control each transducer individually to achieve the desired resolution in the desired area portion of the sensing surface.

According to one embodiment of the invention, the method may further comprise controlling the plurality of ultrasonic transducers to dynamically change a resolution of at least one of the first area portion and the second area portion. Thereby, it is possible to seamlessly change from one resolution to another without a user noticing any difference in appearance. Moreover, the resolution may be changed between different of the above described modes, or it may be changed gradually and arbitrarily between different resolutions.

According to one embodiment of the invention, the cover plate may advantageously be the cover glass of a display panel, and the display panel may further comprise a capacitive touch panel. Thereby, the described fingerprint sensing system can be implemented in touch panel displays such as LCD or OLED displays of the types commonly used in smartphones, tablet computers and the like.

According to one embodiment of the invention, the display panel may further comprise a capacitive touch panel. The method may the further comprise: by the capacitive touch panel, detecting an object in contact with the sensing surface; estimating a contact area of the object; and controlling the resolution of the contact area to a resolution required for fingerprint detection. Accordingly, the capacitive touch panel may be used both to detect an object touching the sensing surface and to estimate a contact area between the object and the sensing surface. Assuming that the object is a finger, the resolution of the estimated are can be controlled to be sufficiently high to capture a fingerprint. This means that a user may place a finger at any point on the sensing surface and have the fingerprint captures and verified by means of the described ultrasonic fingerprint sensing system.

According to one embodiment of the invention, a portion of the sensing surface having the first or second feature detection resolution is smaller than the total sensing surface. Accordingly, it is possible to form sub-areas, or sub regions, of the total sensing surface which has a different resolution for the remaining surface.

According to a second aspect of the invention, there is provided a fingerprint sensing system comprising: a cover plate having a sensing surface configured to be touched by a finger; a plurality of ultrasonic transducers connected to the cover plate and located at the periphery of the cover plate, wherein the plurality of ultrasonic transducers are configured to transmit an acoustic signal propagating in the cover plate, receive an ultrasonic signal having interacted with an object in contact with the sensing surface, and to determine properties of the object based on the received ultrasonic signal; and a control unit. The control unit is configured to: in response to a first input, control the plurality of transducers such that at least a portion of the sensing surface has a first feature detection resolution; and in response to a second input, controlling the plurality of transducers such that at least a portion of the sensing surface has a second feature detection resolution, different from the first feature detection resolution.

The ultrasonic transducers may for example be piezoelectric transducers connected to a control unit by electrodes arranged on opposing sides of a piezoelectric element such that by controlling the voltage of the two electrodes, an ultrasonic signal can be generated which propagates in the cover plate.

According to one embodiment of the invention, the plurality of ultrasonic transducers may advantageously be connected to a bottom surface of the cover plate, the bottom surface being opposite of the sensing surface. A fingerprint sensing system comprising ultrasonic transducers connected to the bottom of the cover plate may be easier to manufacture.

According to one embodiment of the invention, the plurality of ultrasonic transducers may be connected to a side surface of the cover plate, the side surface being perpendicular to the sensing surface. Thereby, the ultrasonic signals can be generated and directly propagate in the desired direction.

According to one embodiment of the invention, the cover plate is configured to form a back surface of an electronic device. Accordingly, the fingerprint sensing system can be provided as part of a glass surface or any other equivalent material where no display is present.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensing system and method according to the present invention are mainly described with reference to a handheld electronic device such as a smartphone comprising the described system integrated in a display panel of the electronic device. However, the described system and method may also be applied in other applications where biometric verification is desirable.

Figure 1A:
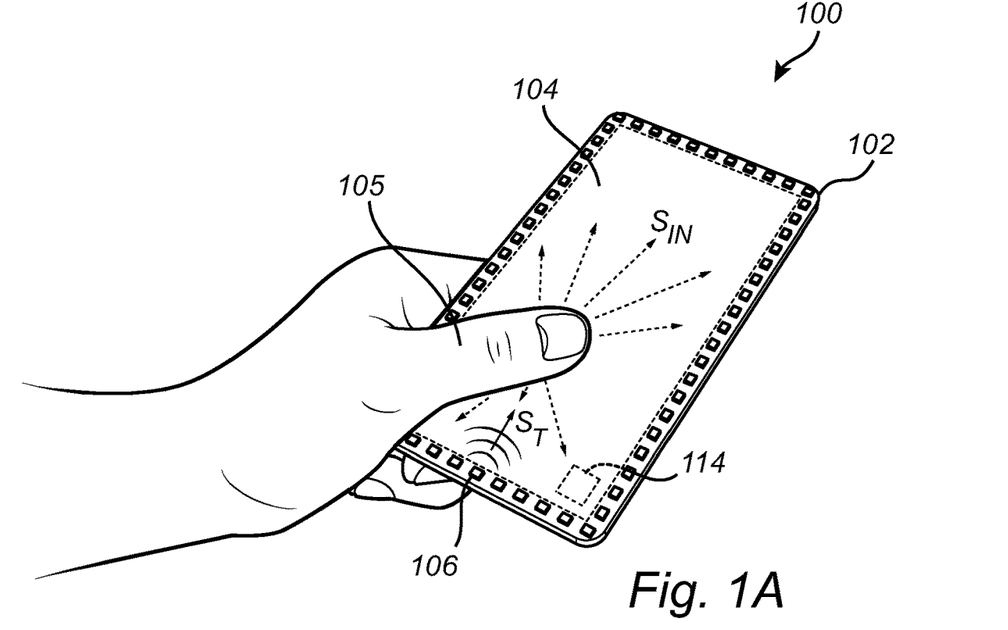
FIG. 1A schematically illustrates a fingerprint sensing system according to an embodiment of the invention.

FIG. 1A schematically illustrates an electronic device in the form of a smartphone 100 comprising a fingerprint sensing system according to an embodiment of the invention. The fingerprint sensing comprises a cover plate 102 having a sensing surface 104 configured to be touched by a finger 105. The cover plate 102 is here illustrated as a transparent cover glass in a display panel of the smartphone 100. However, the cover plate may equally well be a non-transparent cover plate as long as its acoustic properties allows for propagation of ultrasound energy.

The sensing system further comprises a plurality of ultrasonic transducers 106 connected to the cover plate 102 and located at the periphery of the cover plate 102. Accordingly, the ultrasonic transducers 106 are non-overlapping with an active sensing area 104 of the fingerprint sensing system.

Figure 1B:
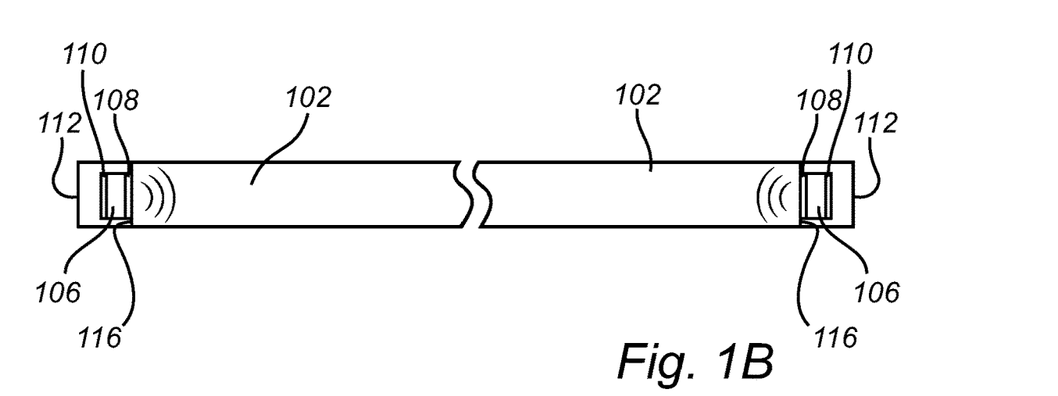
FIG. 1B is a cross section view of a fingerprint sensing system according to an embodiment of the invention.

FIG. 1B is a cross section view of the cover plate 102 where it is illustrated that the ultrasonic transducers 106 are attached to a side surface 116 of the cover plate 102. The ultrasonic transducer is a piezoelectric transducer comprising a first electrode 108 and second electrode 110 arranged on opposing sides of a piezoelectric element 112 such that by controlling the voltage of the two electrodes 108, 110, an ultrasonic signal can be generated which propagates into the cover plate 102. An ultrasonic transducer 106 can have different configurations depending on the type of transducer and also depending on the specific transducer package used. Accordingly the size and shape of the transducer as well as electrode configurations may vary. It is also possible to use other types of devices for the generation of ultrasonic signals such as micromachined ultrasonic transducers (MUTs), including both capacitive (cMUTs) and piezoelectric types (pMUTs). Moreover, additional control circuitry is required for controlling the transducer to emit an acoustic signal having the required properties with respect to e.g. amplitude, pulse shape and timing. However, such control circuitry for ultrasonic transducers is well known to the skilled person and will not be discussed herein.

Figure 1C:
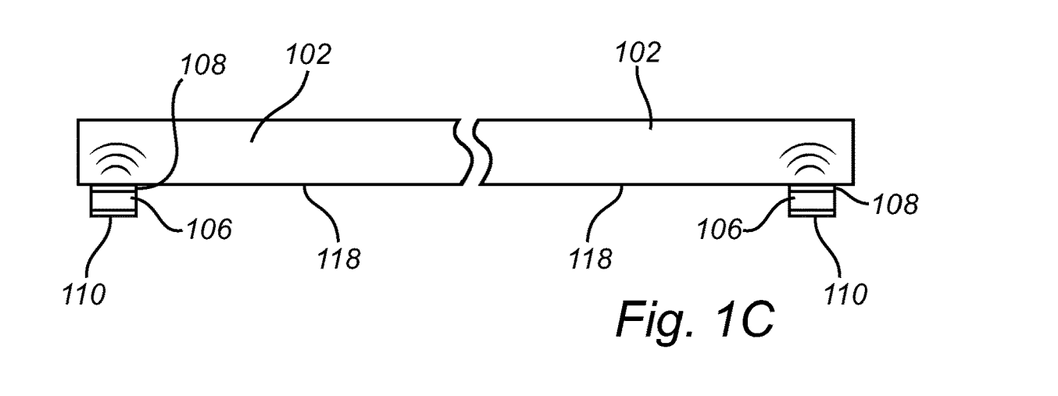
FIG. 1C is a cross section view of a fingerprint sensing system according to an embodiment of the invention.

Moreover, it is also possible to arrange the ultrasonic transducers 106 underneath the cover plate 102 as illustrated in FIG. 1C where the ultrasonic transducers 106 are attached to the bottom surface 118 of the cover plate. Each ultrasonic transducer 106 is configured to transmit an acoustic signal $S_T$ propagating in the cover plate 102 and to receive an ultrasonic signal $S_{IN}$ having interacted with an object 105, here represented by a finger 105, in contact with the sensing surface 104.

The acoustic interaction signals $S_{IN}$ are presently believed to mainly be due to so-called contact scattering at the contact area between the cover plate 102 and the skin of the user (finger 105). The acoustic interaction at the point of contact between the finger 105 and the cover plate 102 may also give rise to refraction, diffraction, dispersion and dissipation of the acoustic signal $S_T$. Accordingly, the interaction signals $S_{IN}$ are advantageously analyzed based on the described interaction phenomena.

The acoustic transmit signal $S_T$ may advantageously be a pulse train of short pulses, and the acoustic interaction signals $S_{IN}$, which may be measured by different receiving ultrasonic transducers 106, are impulse responses. The impulse response data carried by the acoustic interaction signals $S_{IN}$ can be used to reconstruct a representation of the contact area (the fingerprint) using a reconstruction procedure similar to methods used in ultrasound reflection tomography.

It should be understood that the "representation" of the fingerprint of the user may be any information extracted based on the received acoustic interaction signals $S_{IN}$, which is useful for assessing the similarity between fingerprint representations acquired at different times. For instance, the representation may comprise descriptions of fingerprint features (such as so-called minutiae) and information about the positional relationship between the fingerprint features. Alternatively, the representation may be a fingerprint image, or a compressed version of the image. For example, the image may be binarized and/or skeletonized. Moreover, the fingerprint representation may be the above-mentioned impulse response representation.

Accordingly the ultrasonic transducers 106 are configured to determine properties of the object based on the received ultrasonic signal $S_{IN}$. The plurality of ultrasonic transducers 106 are connected to and controlled by a control unit 114. The control unit for controlling the transducers may be embodied in many different ways. There may for example be one central control unit 114 responsible for determining the properties of the acoustic signals $S_T$ to be transmitted, and for analyzing the subsequent interaction signals $S_{IN}$. Moreover, each transducer 106 may additionally comprise control circuitry for performing specified actions based on a received command.

The control unit 114 may include a microprocessor, microcontroller, programmable digital signal processor or another programmable device. The control unit 114 may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

The functionality of the control unit 114 may also be integrated in control circuitry used for controlling the display panel or other features of the smartphone 100.

Figure 2:
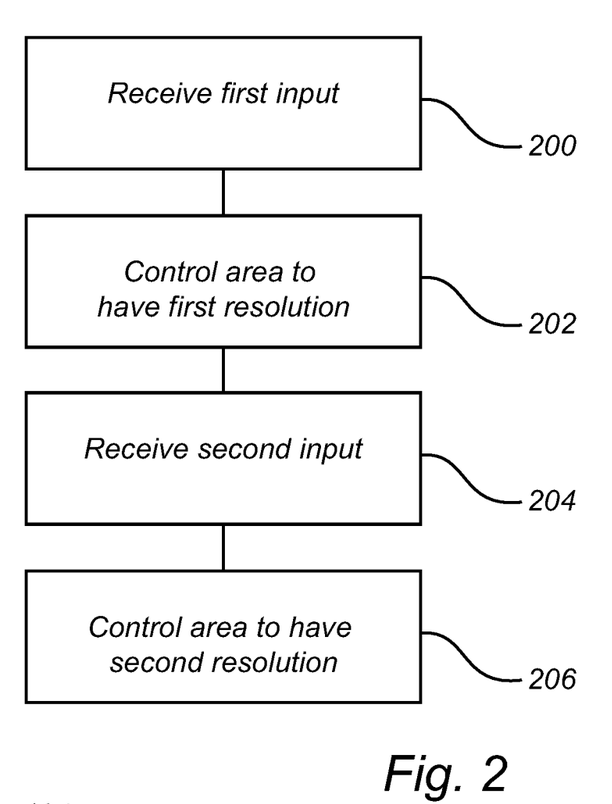
FIG. 2 is a flow chart outlining the general steps of a method according to an embodiment of the invention.

FIG. 2 is a flow chart outlining the general steps of a method according to an embodiment of the invention. The method will be described with further reference to FIG. 3 illustrating steps of the method when performed in the electronic device 100.

The method is here considered to be performed by the control unit 114. For simplicity, it can be assumed that the first and second inputs are commands issued by an operating system or application of the smartphone. The control unit 114 is thus arranged and configured to, in response to the first input 200, control 202 the plurality of transducers to such that at least a portion 300 of the sensing surface 104 has a first feature detection resolution, and in response to a second input 204, control 206 the plurality of transducers such that at least a portion 302 of the sensing surface 104 has a second feature detection resolution, different from the first feature detection resolution. In FIG. 3, the area portion 300 having the first feature detection resolution is equal the entire sensing surface 104 and the area portion 302 having the second feature detection resolution is a sub-area of the entire sensing surface. It is however possible that the two portions are identical and that only the resolution is changed.

The feature detection resolution may be selected from predetermined feature detection resolution modes, such as a touch detection resolution mode, a low resolution fingerprint detection mode, a high resolution fingerprint detection mode, and an enrolment mode. Accordingly, the feature detection resolution is defined in terms of the features which can be detected an identified in the different modes. Thereby, in the touch detection resolution mode, it is assumed that the details of a fingerprint cannot be resolved, and that only the occurrence of an object, such as a finger, touching the sensing surface can be detected.

Figure 3A:
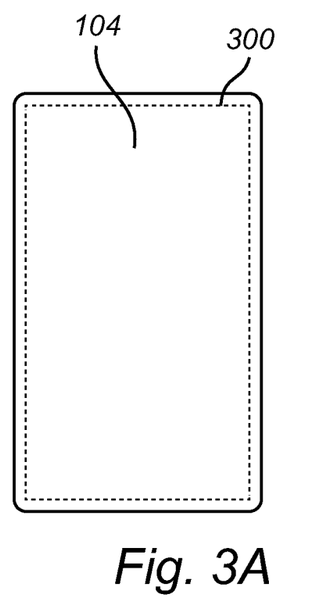
FIG. 3 schematically illustrates steps of a method according to an embodiment of the invention.
Figure 3B:
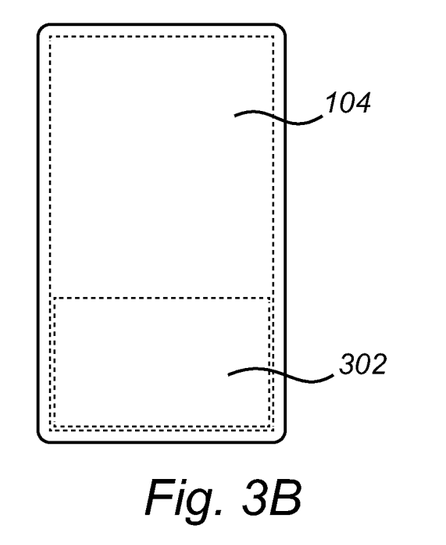

In the example illustrated in FIG. 3, the first area portion 300 may be controlled to be in a touch detection resolution mode, whereas the second area portion 302 may be controlled to be in a high resolution fingerprint detection mode for verification of a user identity. The touch detection resolution mode can be employed when the smartphone 100 is in a sleep or low-power mode. The touch of an object can be registered, after which registration the smartphone wakes up and indicates an area for fingerprint imaging, e.g. the area portion 302 illustrated in FIG. 3B. It should be noted that in applications where the electronic device 100 in which the fingerprint sensing system is arranged comprises a capacitive touch sensitive panel, a "wake up" signal may be received by the capacitive touch sensor after which the ultrasonic fingerprint sensing system is activated.

Figure 4:
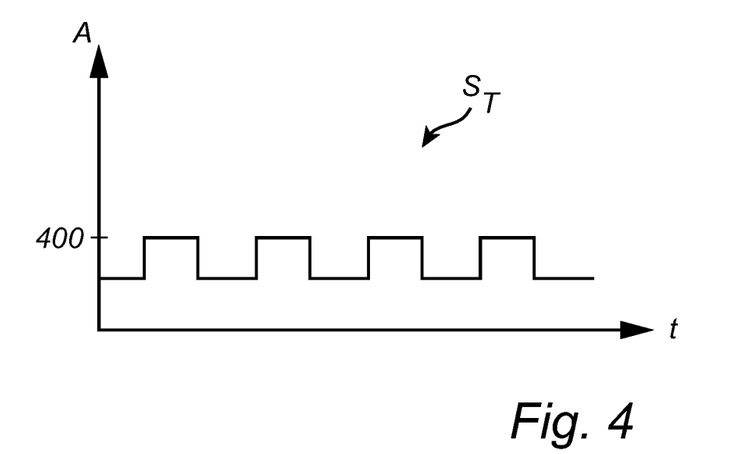
FIG. 4 schematically illustrates a signal used in a fingerprint sensing system according to an embodiment of the invention.

FIG. 4 schematically illustrates an acoustic transmit signal $S_T$ in the form of a pulse train of short pulses (impulses). As discussed earlier, the feature detection resolution is in part related to the power of the transmitted acoustic signal which in turn is related to the power provided to the ultrasonic transducers. The total power of the acoustic transmit signal $S_T$ is determined by the amplitude 400, duty cycle and pulse repetition frequency of the drive signal provided to each ultrasonic transducer. Moreover, many different configurations of the pulses provided to the ultrasonic transducers are possible.

Figure 5A:
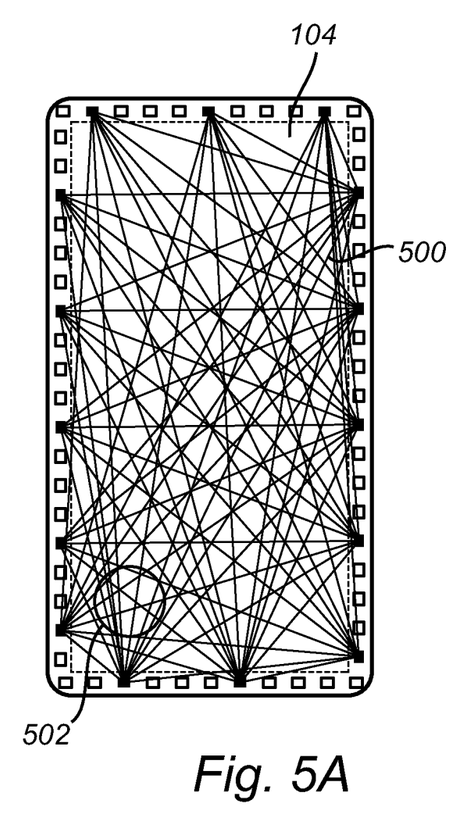
FIGS. 5A-B schematically illustrate features of a method and system according to embodiments of the invention.
Figure 5B:
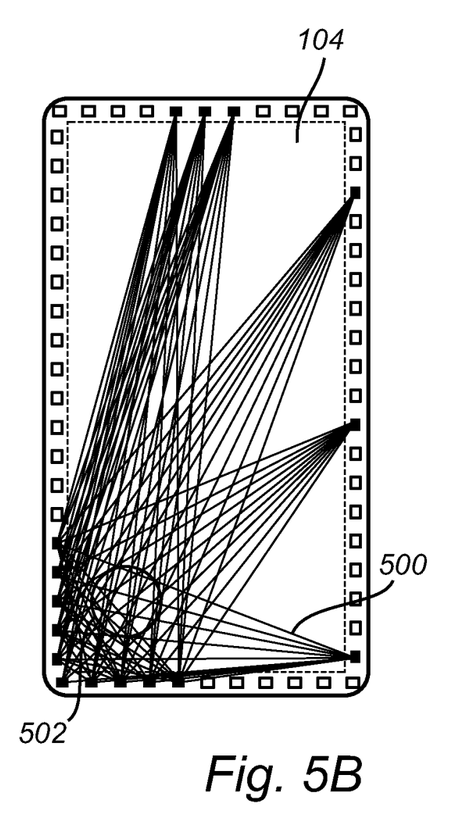

The feature detection resolution in a certain area can in a first approximation be considered to be proportional to the number of paths between active transducers passing through that area. This principle is schematically illustrated by FIGS. 5A and 5B outlining two different cases where two different feature detection resolutions are achieved by controlling which of the ultrasonic transducers to activate out of the total distribution of ultrasonic transducers 106. It should however be noted that FIG. 5A-B des not represent a true physical illustration of the propagation of the ultrasonic waves.

In FIG. 5A, a subset of ultrasonic transducers is activated and the paths 500 between each active transducer and another active transducer which crosses the contact area 502 are illustrated. The active transducers are distributed evenly around the entire sensing area 104, indicating that the feature detection resolution is approximately the same over the entire sensing surface 104.

In FIG. 5B, the distribution of active transducers has been modified so that the active transducers are to a larger degree located close to the relevant area portion 502. Thereby, the number of paths 500 crossing through the area of interest can be significantly increased, thereby increasing the feature detection resolution. Only the paths crossing the selected area portion 502 are illustrated to avoid cluttering the drawings. Accordingly, even though the number of active transducers is approximately the same, a higher feature detection resolution can be achieved in the selected area portion 502.

As schematically illustrated by FIGS. 5A-B, the feature detection resolution can be dynamically controlled by controlling which of the transducers to activate. The physical location of transducers can of course be varied in many different ways. It may for example not be required to have transducers located on all four sides of the cover plate 102. Moreover, the distribution of transducers must not be uniform around the periphery. If it is determined that fingerprint detection will only be performed in a certain area portion of the entire cover plate 102, the transducers can be arranged accordingly. It should be pointed out that the illustrations in FIG. 5A-B does not represent actual physical phenomena of the acoustic signals, and that the figures merely serve to illustrate the principle of a dynamically controllable feature detection resolution in a selected area portion cover plate.

Figure 6:
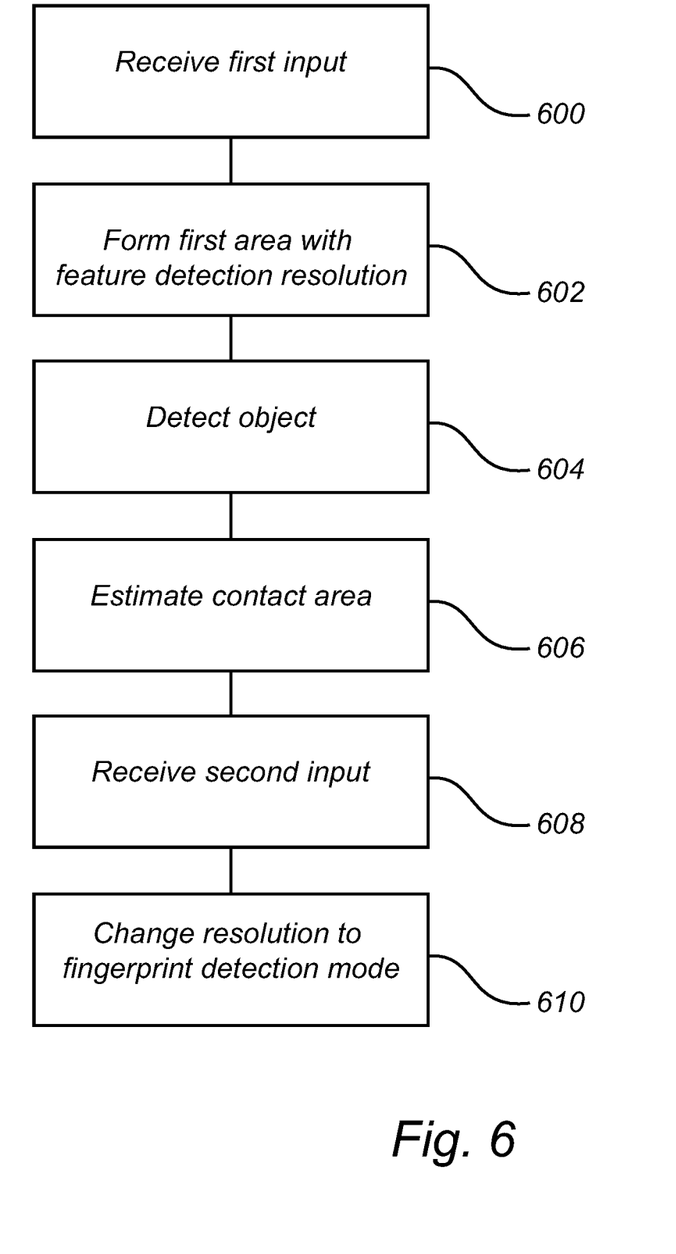
FIG. 6 is a flow chart outlining the general steps of a method according to an embodiment of the invention.
Figure 7A:
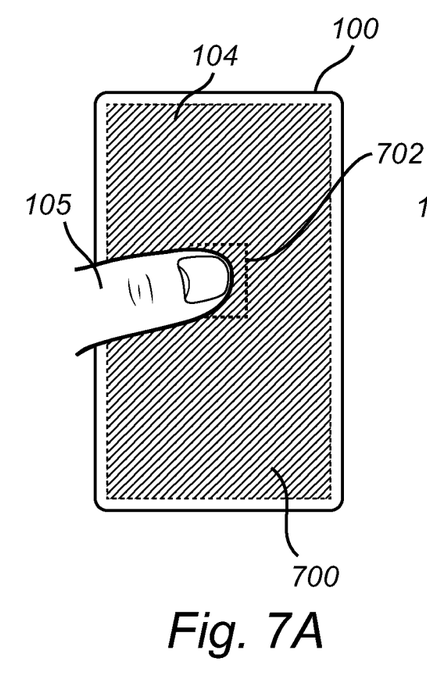
FIGS. 7A-B schematically illustrates a fingerprint sensing system according to an embodiment of the invention.
Figure 7B:
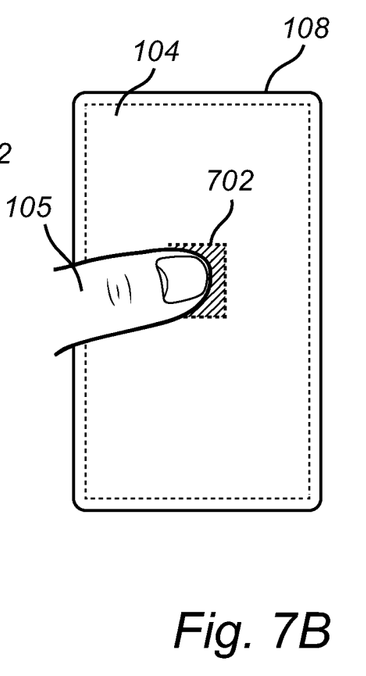

FIG. 6 is a flow chart outlining steps of an example method according to an embodiment of the invention, and the method will be further illustrated by FIGS. 7A-B illustrating steps of the method. In a first step, the control unit 114 receives 600 a first input which is a command to control 602 the plurality of ultrasonic transducers to form a first area portion 700 to have a resolution corresponding to touch detection resolution mode. Here, the first area portion 700 corresponds to the entire sensing area of the smartphone 100. Next, an object 105 contacting the first area portion 700 is detected 604. Once an object is detected, it is also possible to estimate 606 a contact area 702 of the object. Depending on the specific configuration of the touch detection resolution mode, it may be possible to estimate the contact area 702 while remaining in the touch detection resolution mode. It is also possible to activate additional transducers to perform a more accurate estimation of the contact area. FIGS. 7A-B may also represent a back surface of an electronic device such as a smartphone.

Once the contact area is established, a second command is received 608 to control the ultrasonic transducers to increase the resolution of the contact area 702 to a low or high resolution fingerprint detection mode, or to an enrolment mode. By means of the described method, an electronic device where a user can place a finger on the display in a sleep or low power mode, the device determines the location of the finger and changes the resolution of the contact area so that a fingerprint can be acquired and the identity of the user can be verified. All of this can be assumed to occur seamlessly so that the user only needs to touch the screen to perform an authentication.

In general the dependency between the feature detection resolution and the power can be explained by three different principles. First, with respect to the power consumed by the transducers, where a higher amplitude of the signal provided to a transducer will increase the signal to noise ratio on the received signal. The resolution of a final fingerprint image can also be increased by increasing the number of active transducers transmitting a signal, thereby increasing the number of directions from which a pulse is transmitted in order to increase the resolution of the final image.

Since a device in which the fingerprint system is arranged can be assumed to be in an idle mode most of the time, it is particularly important to minimize the power consumption of the fingerprint sensing system in an idle mode while still being able to wake up the device. When the device is idle, the fingerprint sensing system may thus be in a touch detection resolution mode.

In a touch detection resolution mode, it may be sufficient to activate only one transducer to transmitting a signal at a sufficiently low repetition frequency of about 10 Hz in order to detect if a finger is touching the surface, thereby enabling an idle mode with a low power consumption.

In practice the transducers may be sequentially activated in transmitter—receiver pairs based on a predetermined timing schedule. For the example of FIG. 7B where it is desirable to form a fingerprint detection area at a known location, known algorithms will calculate which transmit and receive pairs that have the finger in the field of view. Such calculations are based on knowledge of the properties of the specific transducers and do not require that the transducers are powered up. After determining which pairs to activate, the system updates transmit and receive sequences accordingly. The transmit and receive sequences are advantageously optimized to result in a minimized power consumption for a given a required resolution and also to the minimum required number of pairs needed to resolve an area.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling a plurality of ultrasonic transducers in a fingerprint sensing system, the fingerprint sensing system comprising a cover plate having a sensing surface configured to be touched by a finger, and a plurality of ultrasonic transducers located at the periphery of the cover plate, wherein the ultrasonic transducers are non-overlapping with an active sensing area of the fingerprint sensing system, and wherein the plurality of ultrasonic transducers are configured to transmit an acoustic signal propagating in the cover plate, receive an ultrasonic signal having interacted with an object in contact with the sensing surface, and to determine properties of the object based on the received ultrasonic signal; the method comprising:
   in response to a first input, controlling a power level of the plurality of transducers such that at least a portion of the sensing surface has a first feature detection resolution; and
   in response to a second input, controlling the power level of the plurality of transducers such that at least a portion of the sensing surface has a second feature detection resolution, different from the first feature detection resolution,
   wherein controlling the power level of the plurality of transducers comprises adjusting a duty cycle of a drive signal provided to the plurality of transducers.

2. The method according to claim 1, wherein controlling the plurality of ultrasonic transducers comprises controlling each of the transducers to be in an on-state or in an off-state.

3. The method according to claim 1, wherein controlling the power level of the plurality of transducers comprises controlling a power level of each ultrasonic transducer in a continuous range between an off-state and a maximum power state.

4. The method according to claim 1, wherein the first feature detection resolution and the second feature detection resolution are selected from a group of predetermined feature detection resolutions comprising: a touch detection resolution mode, a low resolution fingerprint detection mode, a high resolution fingerprint detection mode, and an enrolment mode.

5. The method according to claim 4, wherein the first input and/or the second input is a command to form an area of the sensing surface having a resolution selected from the group of predetermined feature detection resolutions.

6. The method according to claim 1, wherein the first input and/or the second input is generated by the detection of an object touching the sensing surface.

7. The method according to claim 1, further comprising:
   receiving a first input comprising a command to control said plurality of ultrasonic transducers to form a touch detection area corresponding to at least a portion of the sensing surface;
   detecting an object in contact with the sensing surface in said touch detection area;
   estimating a contact area of the object; and
   receiving a second input comprising a command to change the feature detection resolution of the contact area.

8. The method according to claim 4, further comprising:
   receiving a first input comprising a command to control said plurality of ultrasonic transducers to form a touch detection mode area corresponding to at least a portion of the sensing surface;
   detecting an object in contact with the sensing surface in said touch detection area;
   estimating a contact area of said object; and
   receiving a second input comprising a command to change the feature detection resolution of said contact area to the low resolution fingerprint detection mode or the high resolution fingerprint detection mode.

9. The method according to claim 1, further comprising controlling the plurality of ultrasonic transducers such that active transducers form a non- uniform distribution around the circumference of the cover plate.

10. The method according to claim 1, wherein the cover plate is a cover glass of a display panel.

11. The method according to claim 10, wherein the display panel further comprises a capacitive touch panel.

12. The method according to claim 11, wherein the display panel further comprises a capacitive touch panel, the method further comprising:
   by the capacitive touch panel, detecting an object in contact with the sensing surface:
   estimating a contact area of the object; and
   controlling the feature detection resolution of the contact area to a resolution required for fingerprint detection.

13. The method according to claim 1, wherein a portion of the sensing surface having the first or second feature detection resolution is smaller than the total sensing surface.

14. A fingerprint sensing system comprising:
   a cover plate having a sensing surface configured to be touched by a finger;
   a plurality of ultrasonic transducers connected to the cover plate and located at the periphery of the cover plate, wherein the ultrasonic transducers are non-overlapping with an active sensing area of the fingerprint sensing system, and wherein the plurality of ultrasonic transducers are configured to transmit an acoustic signal propagating in the cover plate, receive an ultrasonic signal having interacted with an object in contact with the sensing surface, and to determine properties of the object based on the received ultrasonic signal; and
   a control unit configured to:
   in response to a first input, control a power level of the plurality of transducers such that at least a portion of the sensing surface has a first feature detection resolution; and
   in response to a second input, control the power level of the plurality of transducers such that at least a portion of the sensing surface has a second feature detection resolution, different from the first feature detection resolution,
   wherein the control unit controls the power level of the plurality of transducers by adjusting a duty cycle of a drive signal provided to the plurality of transducers.

15. The fingerprint sensing system according to claim 14, wherein the plurality of ultrasonic transducers are connected to a side surface of the cover plate, the side surface being perpendicular to the sensing surface.

16. The fingerprint sensing system according to claim 14, wherein the plurality of ultrasonic transducers are connected to a bottom surface of the cover plate, the bottom surface being opposite of the sensing surface.

17. The fingerprint sensing system according to claim 14, wherein the cover plate is a cover glass of a display panel.

18. The fingerprint sensing system according to claim 17, wherein the display panel further comprises a capacitive touch panel.

19. The fingerprint sensing system according to claim 14, wherein the cover plate is configured to form a back surface of an electronic device.

20. An electronic device comprising a fingerprint sensing system according to claim 14.

* * * * *